July 31, 1923.

H. N. HALVERSEN

GRADUATING APPLIANCE

Filed April 5, 1920

WITNESS:
Gustav Genzlinger.
A. J. Sauser.

INVENTOR
Hans N. Halversen
BY
Walter M. Fuller
ATTORNEY

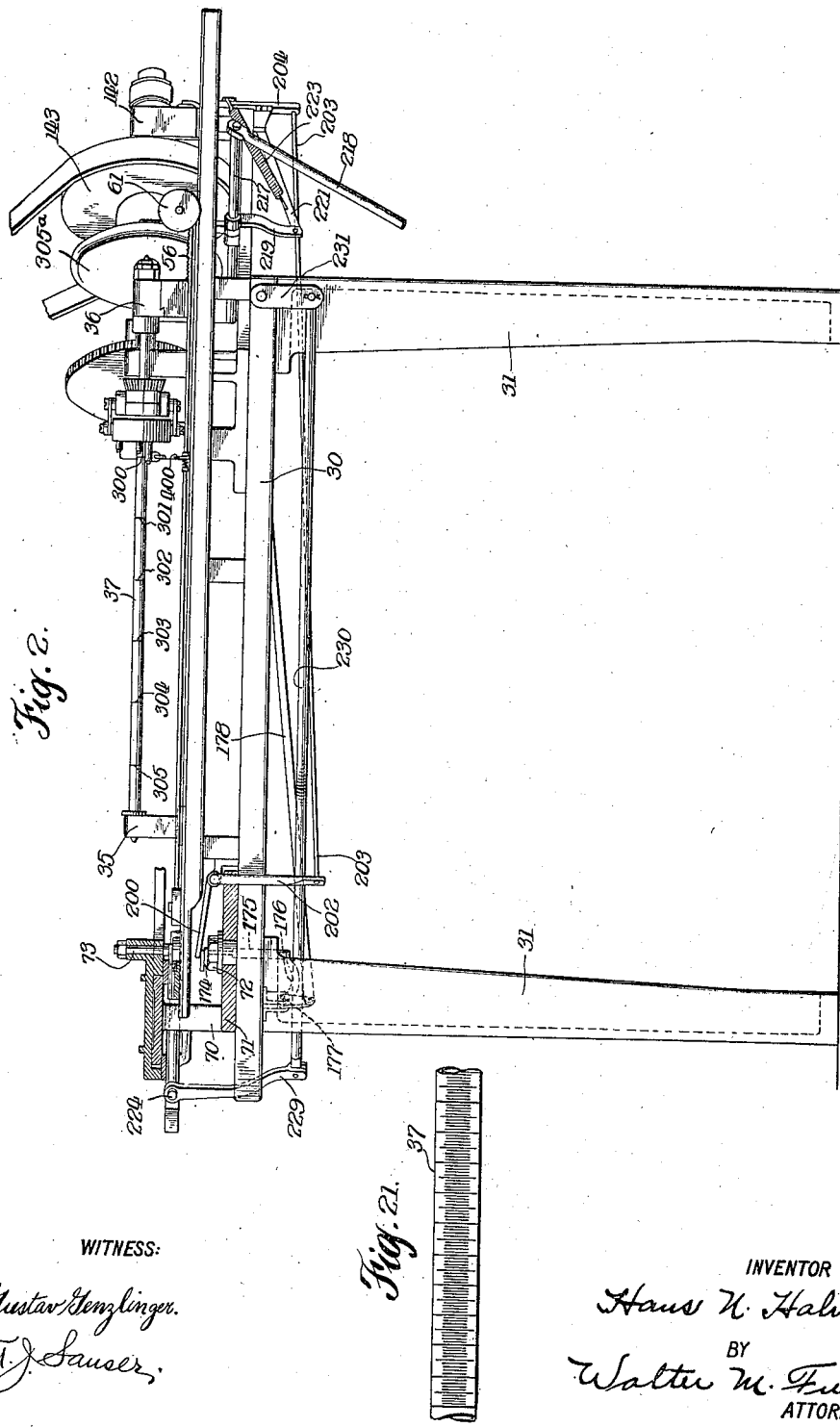

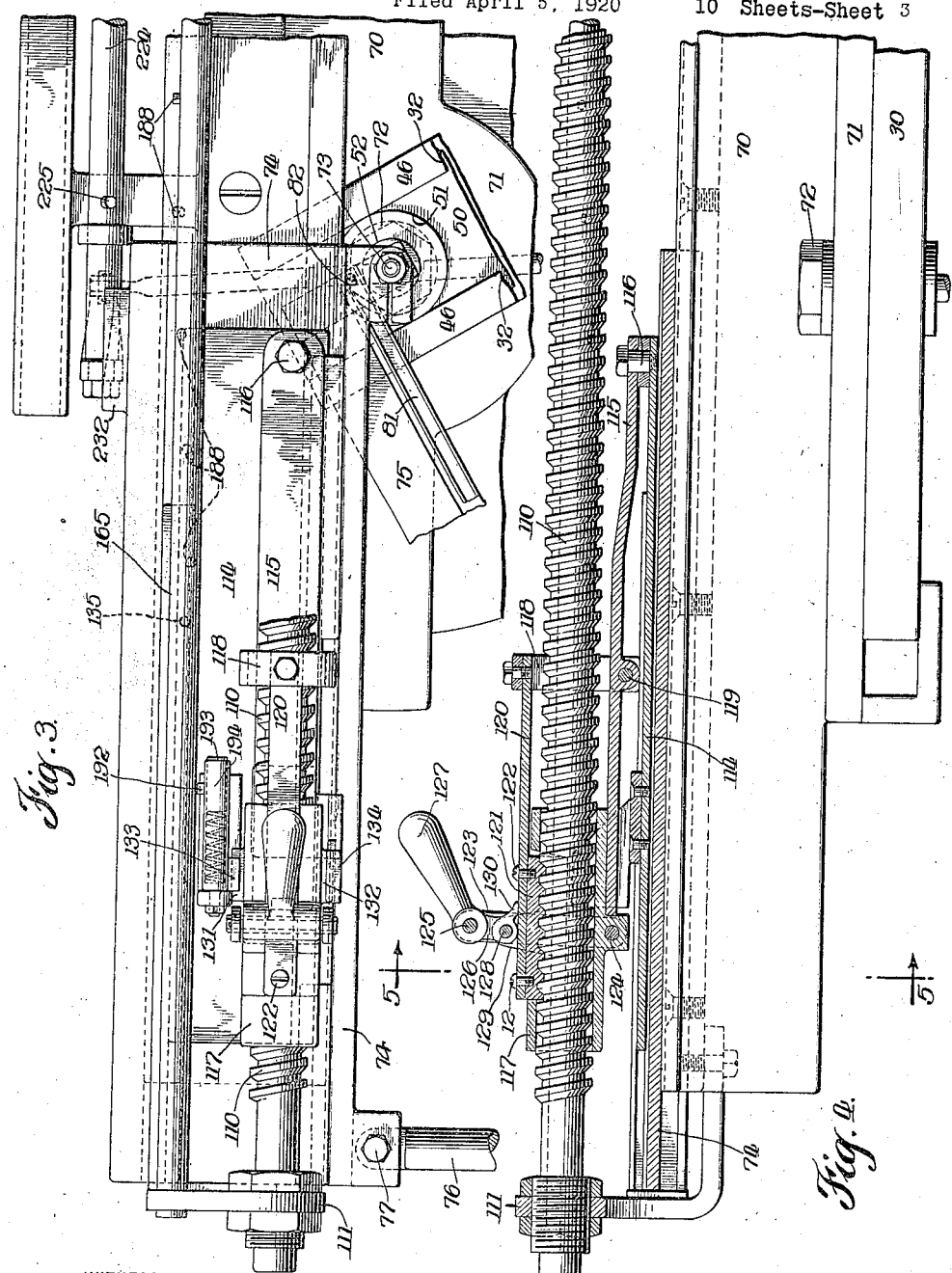

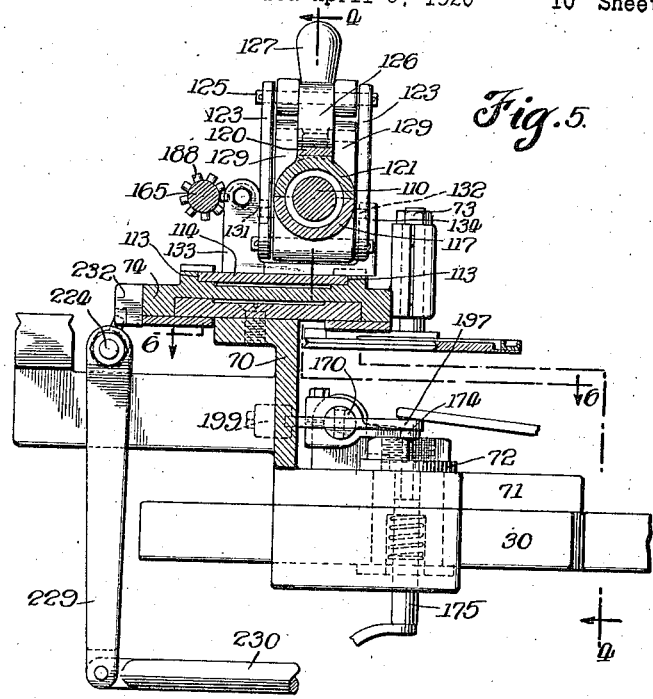
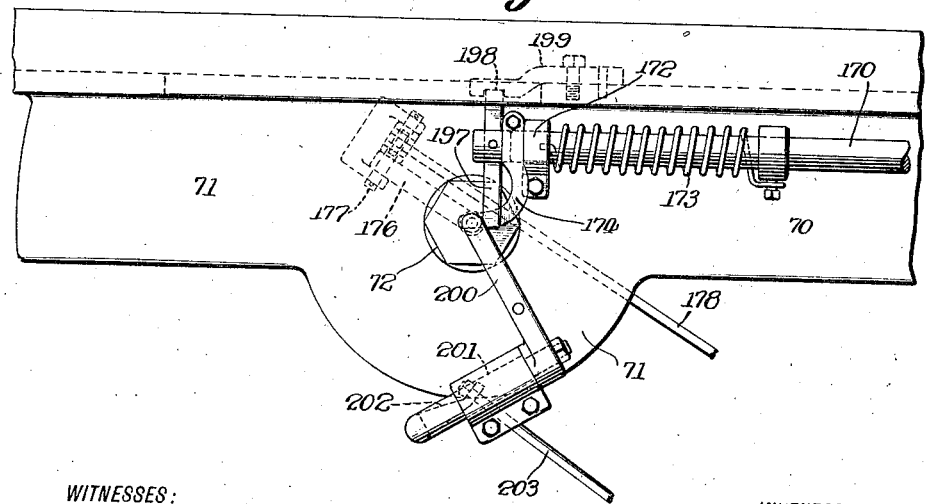

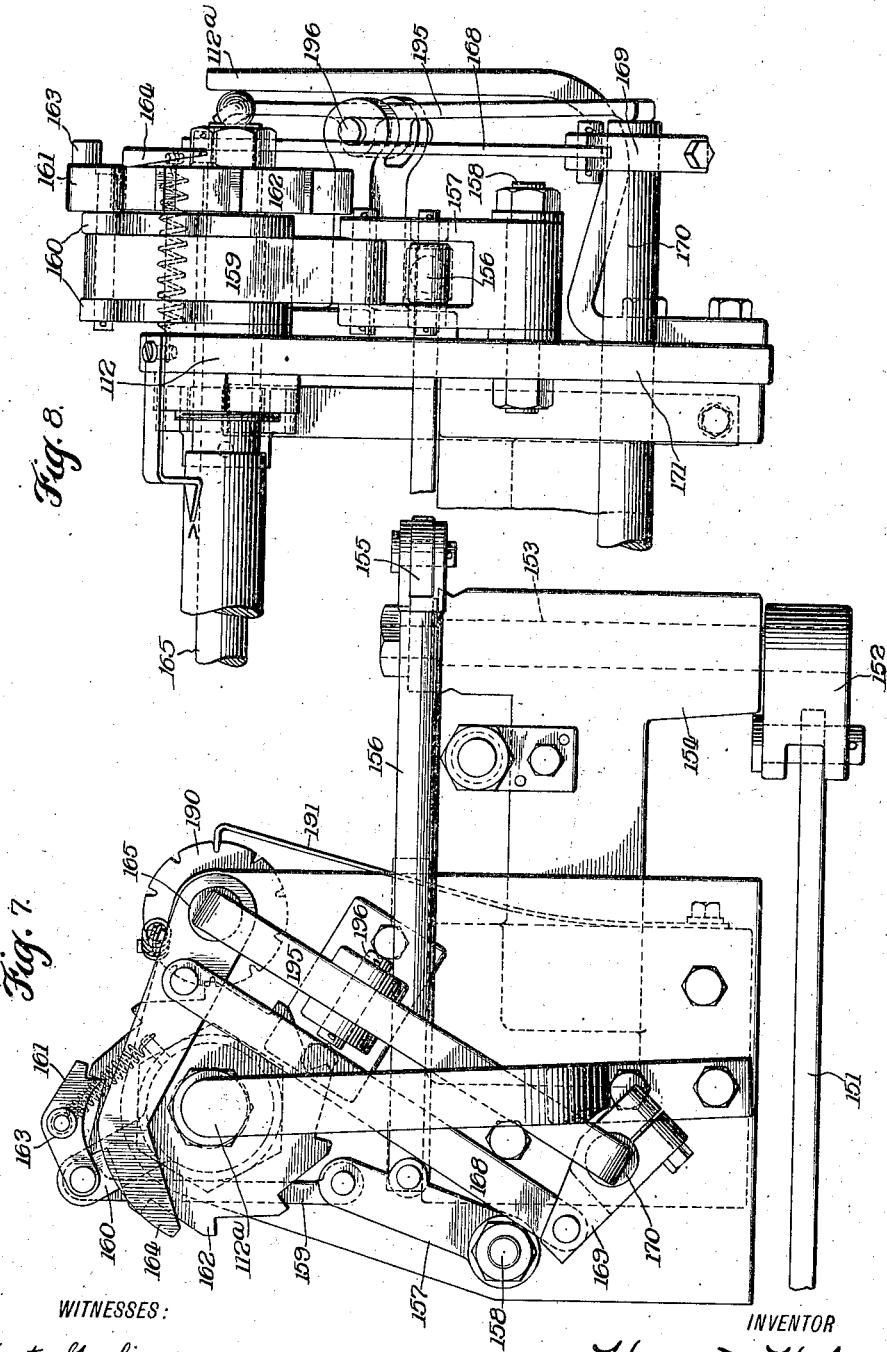

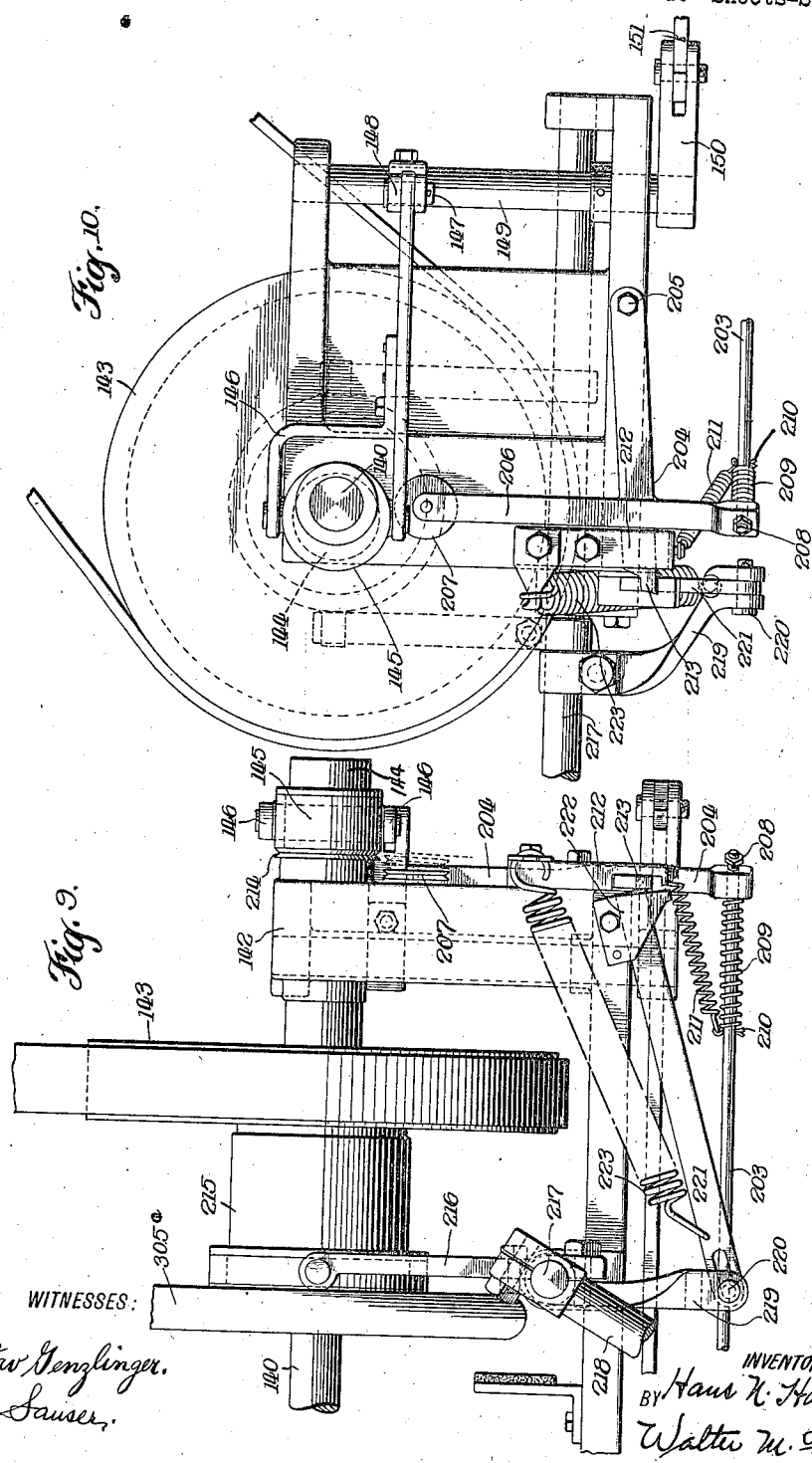

July 31, 1923.

H. N. HALVERSEN

GRADUATING APPLIANCE

Filed April 5, 1920    10 Sheets-Sheet 7

1,463,317

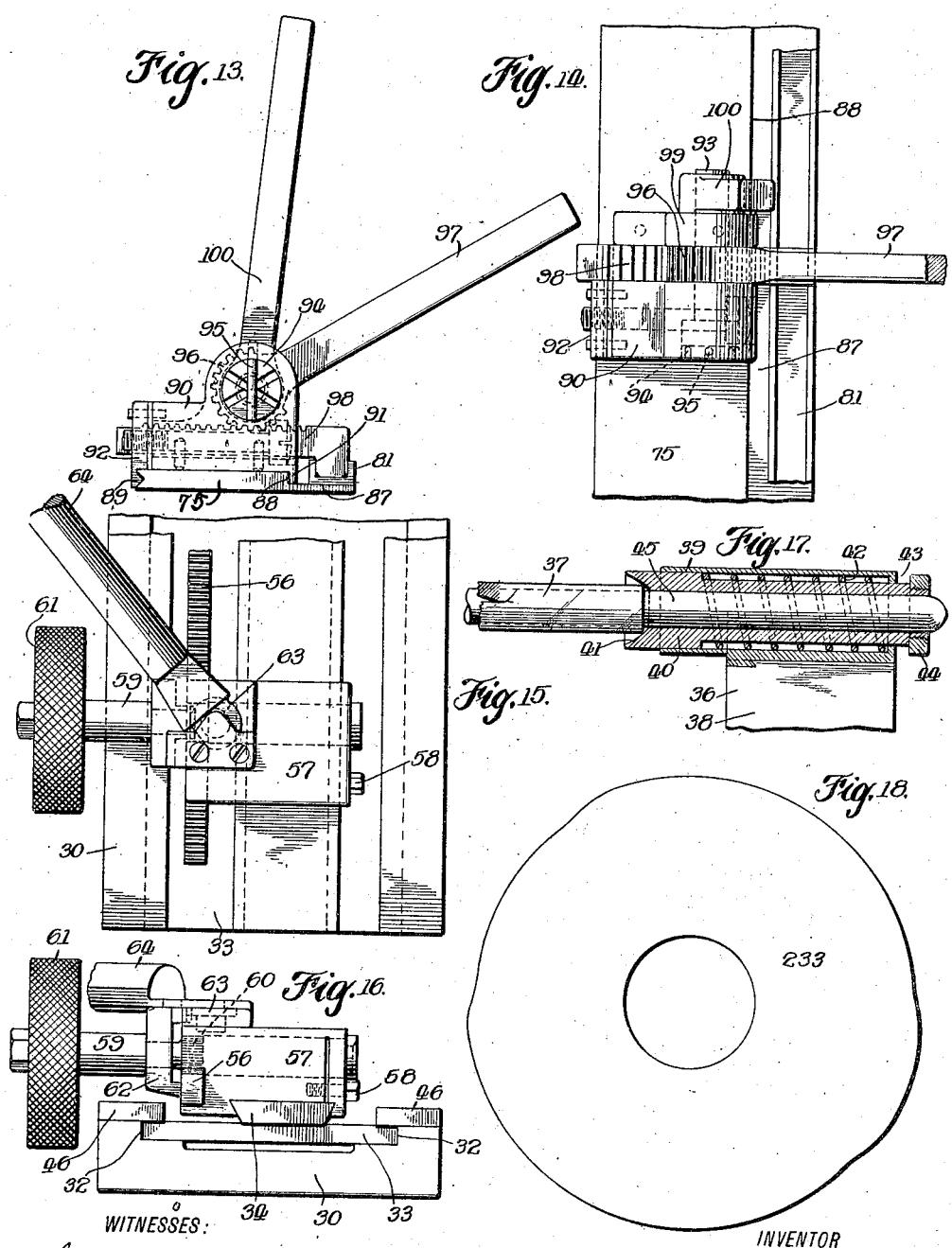

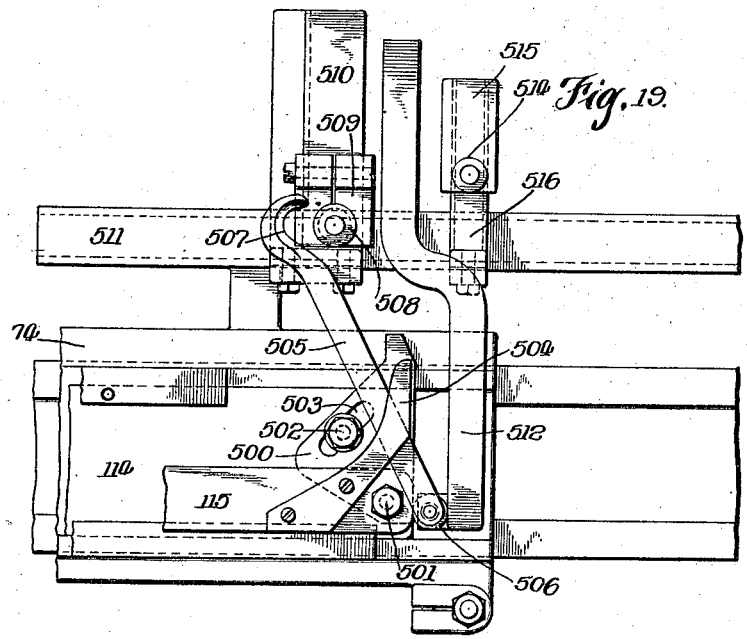
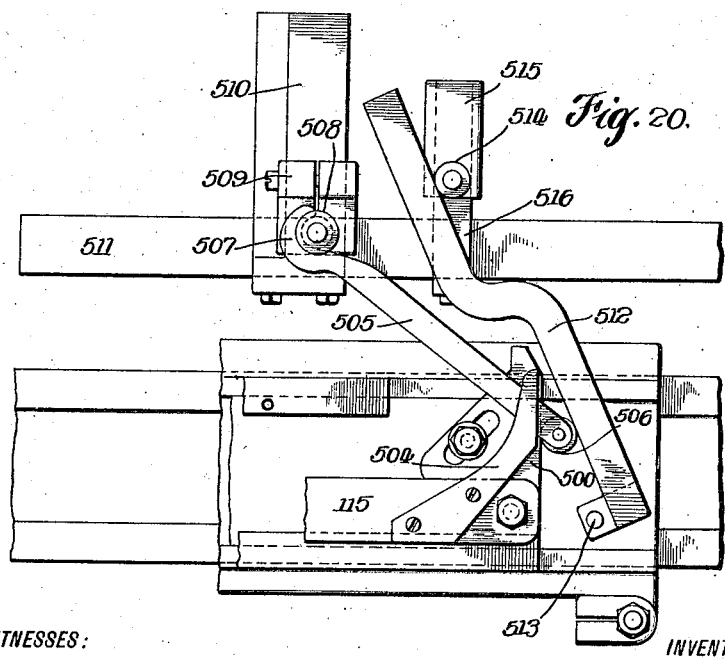

July 31, 1923.  H. N. HALVERSEN  1,463,317
GRADUATING APPLIANCE
Filed April 5, 1920    10 Sheets-Sheet 10
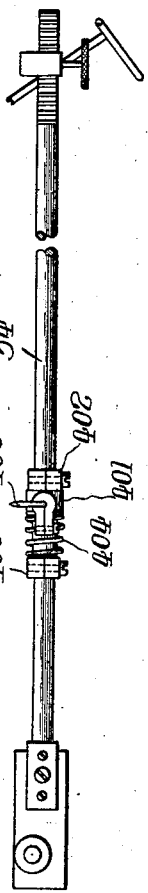
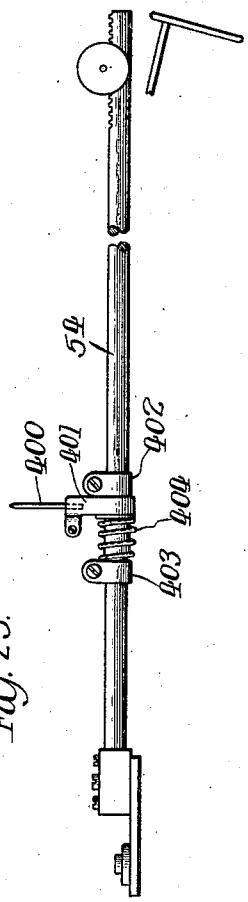
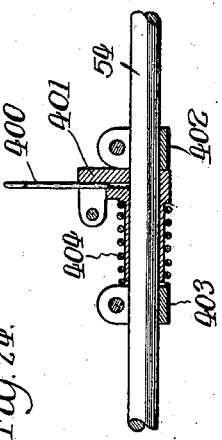

Patented July 31, 1923.

1,463,317

UNITED STATES PATENT OFFICE.

HANS N. HALVERSEN, OF VINELAND, NEW JERSEY, ASSIGNOR TO KIMBLE GLASS COMPANY, OF CHICAGO, ILLINOIS, A CORPORATION OF ILLINOIS.

GRADUATING APPLIANCE.

Application filed April 5, 1920. Serial No. 371,194.

*To all whom it may concern:*

Be it known that I, HANS N. HALVERSEN, a citizen of the United States, residing at Vineland, in the county of Cumberland and State of New Jersey, have invented certain new and useful Improvements in Graduating Appliances, of which the following is a specification.

This invention relates to graduating engines or machines and pertains more particularly, but not exclusively, to appliances for marking spaced volume graduations on the outer surfaces of glass-tubes. Such tubes are usually externally covered with wax and the scriber or marker traces the graduations or scale lines through the wax, whereby when the tube is removed from the machine, the lines, by suitable acids, may be etched into the surface of the tube.

The internal caliber or bore of glass-tubes necessarily varies somewhat throughout its length due to unavoidable irregularities produced during the drawing of the tubing, and, although such variations in volume are comparatively slight, a machine embodying this invention compensates for such changes or dimensional differences, and, so to speak, distributes the variation properly in the scale markings, whereby the graduation of the tube is effected with great accuracy.

A further purpose of the invention is to provide a mechanism which will automatically trace a portion of the graduation lines part way around the tube and will cause other lines, for example, every tenth line, to extend the full distance around the surface of the tube. It is also capable of marking other lines, for instance, every fifth line, somewhat longer and hence more readily discernible or more conspicuous than the unit lines.

An additional feature of the invention is the capability of the machine for properly and accurately graduating tapered tubes and bodies and those which are in part straight and in part tapered, both portions of such latter style of tube being correctly marked without attention on the part of the operator, the change in graduations from regular to irregular spacing occurring entirely automatically.

Another advantage in the use of a machine embodying this invention resides in the elimination or taking up of the slack or looseness in the operating parts of the mechanism whereby to secure extreme accuracy in the graduation markings.

Furthermore, the invention includes means for rendering any wabbling of the operating feed screw-shaft comparatively ineffective on the travel of the carriage actuated by such shaft.

Still a further feature of the invention is the automatic stopping of the machine after the final line has been drawn by the scriber or marking needle.

In order that those skilled in this art may have a full and complete understanding of this invention and the manner of securing the above-specified and other desirable objects and purposes, a preferred embodiment of the invention has been illustrated in the accompanying drawings forming a part of this specification to which reference should be had in connection with the following detailed description of the construction and mode of operation of the appliance illustrated therein. In these drawings, throughout the various views, like reference characters refer to the same parts.

In these drawings:

Figure 2 is a vertical section on line 2—2 of Figure 1, the parts being viewed in the direction indicated by the arrows;

Figure 3 is a fragmentary plan view on an enlarged scale of the screw mechanism for operating the wedge structure which feeds the glass-tube along step-by-step during the marking operation;

Figure 4 is a longitudinal vertical section through the portion of the mechanism shown in Figure 3 and may be considered as a section on line 4—4 of Figure 5;

Figure 5 is a vertical cross-section on line 5—5 of Figure 4, the parts being viewed in the direction indicated by the arrows.

Figure 6 is a horizontal view taken on line 6—6 of Figure 5;

Figures 7 and 8 are end and side elevations respectively of the ratchet and other mechanism associated with the feed screw-shaft;

Figures 9 and 10 illustrate fragmentarily in elevation and end view respectively the power driving mechanism and other parts of the appliance;

Figures 13 and 14 illustrate in end view and plan respectively one of the adjusting and holding means for the flexible channel bar of the wedge mechanism;

Figures 15 and 16 are a fragmentary plan view and an end view respectively of the gear and rack device provided for adjusting the length of the slide carrying the tube to be graduated;

Figure 17 is a vertical section on an enlarged scale through the tail-stock for holding the glass-tube during the graduating work thereon;

Figure 18 is a face view of the cam which controls the lengths of the graduation lines to be marked on the tubes;

Figures 19 and 20 show in plan view two different positions of the elements employed to effect unequal spacing of the graduations, such as are required on a tapered body;

Figure 21 shows a fragment of a straight glass-tube graduated by this improved appliance; and Figures 22, 23 and 24 are detail views of the mounting of one of the pointers.

Figure 1:
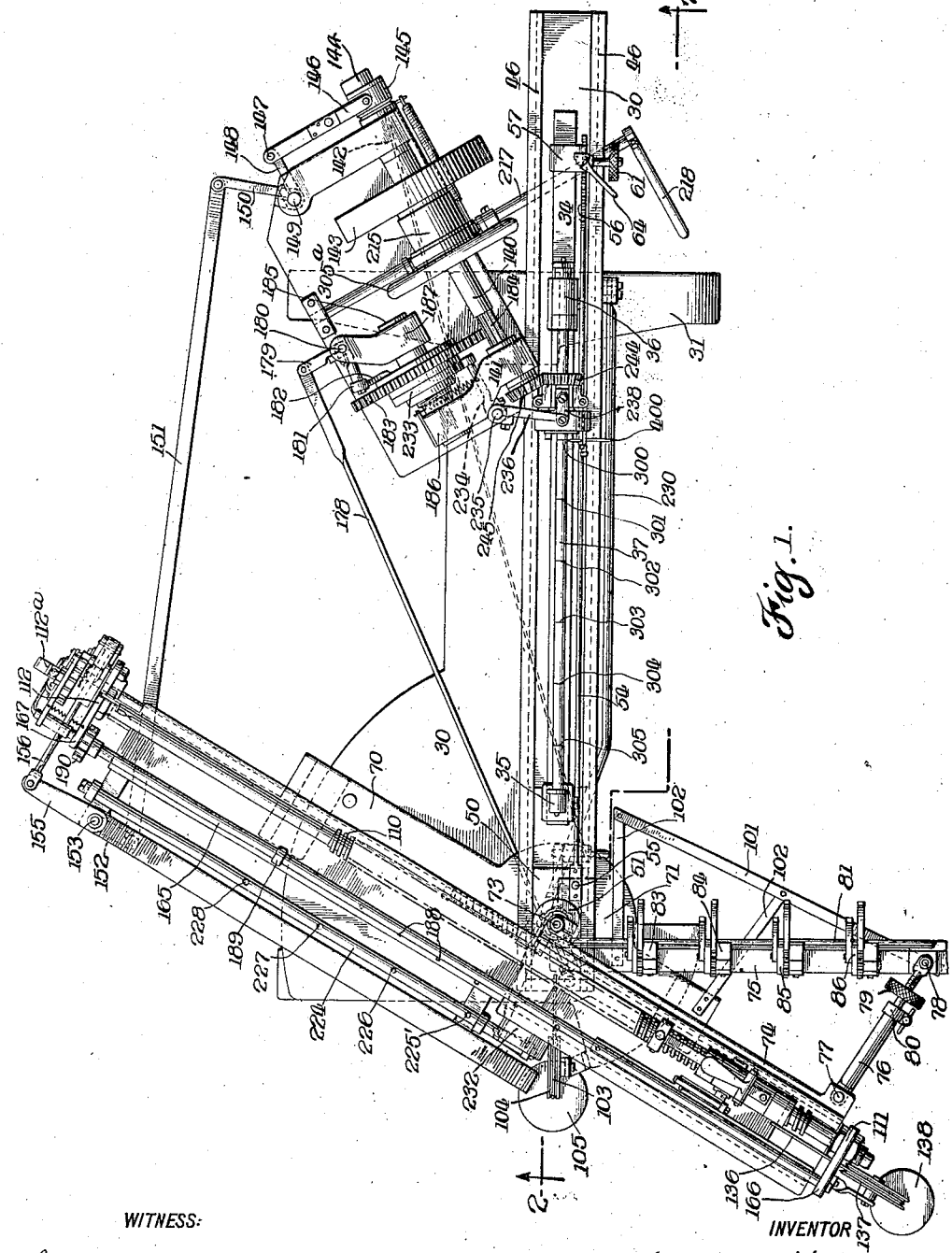
Figure 1 is a general plan view of the construction, some of the details of structure being omitted for the sake of clearness of illustration.

Referring to these drawings, more particularly Figures 1 and 2, it will be observed that the machine comprises a main-frame or table-portion 30, supported on suitable legs 31, 31, having on its top face a pair of opposed guide-grooves 32, 32 (Fig. 16) accommodating between them a main-slide 33 on the upper face of which is a lengthwise-disposed undercut or dovetail rib 34. Fitted on, longitudinally adjustable on, and adapted to be clamped to, such rib by any ordinary means, not necessary to illustrate, are head and tail stocks 35 and 36 respectively (Figures 1, 2, and 17) adapted to support the opposite ends of the glass-tube 37 to be graduated and the metal rod 45 inserted in such tube.

Such tube-supporting stocks may be of any suitable construction, but in the present instance the tail-stock 36 shown in detail in Figure 17, comprises a standard 38 fitted at its top end with a demountable shell 39 having any appropriate interlocking connection with the standard and accommodating internally a hollow, shouldered sleeve 40 having a conical or flaring socket 41 at one end adapted to receive and press against the corresponding end of the glass-tube 37 which, in this particular instance, as is illustrated, is of uniform diameter, in other words, it is untapered. This sleeve is held to its work yieldingly by a coil-expansion spring 42 housed in the shell and bearing at one end against the shoulder of the sleeve and at its opposite end against an apertured end wall 43 of the shell through the hole of which the sleeve extends. The protruding portion of the sleeve is screw-threaded and fitted with a nut 44 acting as a stop limiting the extent of sliding of the sleeve to the left as the parts are viewed in Figures 1 and 17. Sleeve 40 receives a cylindrical metal rod 45 in its interior on which the glass-tube is fitted to prevent displacement or bending of the tube and to prevent the insertion in the machine of a tube unduly irregular.

The actual construction of these head and tail stocks is largely immaterial so long as they firmly hold the glass-tube in place and against rotation and are of such structure that the tubes may be inserted in the machine and removed therefrom with facility.

As is illustrated in Figures 1 ad 2, the left-hand part of the machine is supplied with a supplemental or auxiliary slide 50 fitted in the guide-slots 32, 32 and supplied on its top face with a large roller 51 of a diameter to roll on the opposed faces of the two guide-bars 46, 46 forming the tops of the slots 32 and an independently-revoluble concentric, upper, smaller, anti-friction roller 52, concentric with roller 51, supplied for a purpose hereinafter indicated. These two rollers may be conveniently independently mounted to revolve on a short upstanding shaft carried by the slide and the common vertical axis of such anti-friction rollers is in the central, longitudinal, vertical plane of the main-slide 33 in which plane, of course, the axis of the tube to be graduated resides.

The left-hand end of a rod 54 is fixed at 55 to this complementary slide 50 and its other end portion is formed as a rack 56 with its teeth uppermost as shown in Figures 1, 15, and 16. A block 57 is adjustable lengthwise on the dovetail rib 34 of slide 33 and is adapted to be clamped or held firmly thereto in any position desired by turning its holding-screw 58 (Figures 15 and 16). This block affords a bearing for a cross-shaft 59 equipped with a pinion 60 in mesh with the teeth of the rack and with a knurled handle 61 by means of which the shaft, gear, and rack may be manipulated. In order to maintain the desired adjustment between these parts, the block which is recessed for the accommodation of the rack is provided with a clamp 62 to engage the side of the rack and clamp it between itself and the block, such element 62 being actuated by a cam or eccentric 63 engaging its upper portion and operated by a handle 64, the part 59 constituting a fulcrum for element 62. By these means the distance between the two slides 33 and 50 may be adjusted or varied.

During the graduation of the tube, the connected slides 33 and 50 and their tube-supporting head and tail stocks are necessarily moved along in the guide grooves 32, 32 interruptedly or step-by-step to provide the spaces between the graduation lines and for the accomplishment of this result the following co-operating instrumentalities are employed.

At the left-hand end of the machine an elongated, diagonally-disposed guide 70 of irregular shape has its base-portion 71 pivotally mounted on the top of the main-frame 30 in register with the central longitudinal axis of the combination slide 33—50, by means of a hollow or perforated bolt 72 (Figures 2, 4, 5, and 6) whereby the guide may be adjusted angularly, as will be readily understood. A carriage 74, slidable lengthwise on such oblique guide, has a diagonal bar 75 hinged by its lateral extension on an overhanging part thereof at 73 near the rear end of the carriage above the center line of the combination slide 33—50, and the angular disposition of such bar with relation to the carriage is determined by a telescopically-adjustable means 76 pivoted to the front end of the carriage at 77 (Figures 1 and 3) and to the front end of the bar at 78 (see Figures 1, 2, 3, and 5). The length of this link may be varied or modified by turning the threaded knurled disc 79 and the adjustment thus secured may be maintained unchanged by tightening a clamp 80 which locks the two parts of the link together and against relative movement. The carriage and the pivoted bar form a wedge, the angle of which may be varied by manipulating the length of the connecting link, all as will be readily understood.

In order to make this wedge effective during its travel to operate the combination slide carrying the glass-tube to be marked or graduated, the bar 75 carries a flexible channel-bar 81 on its top face, such resilient element bearing against the periphery of the roller 52 on slide 50. (See Figure 3.) Such flexible or deformable bar is held in place at its rear end by a pin 82 (Figure 3) securing it to the element 75 and by four clamps 83, 84, 85, and 86 (Figure 1) by means of which the bar may be flexed or bent laterally and maintained firmly and securely in that condition for the purpose of compensating for variations in the internal caliber or diameter of the tube to be graduated.

One of such clamps is shown in detail in Figures 13 and 14 from which illustrations it will be clear that the bar 75 has a longitudinal depression 87 along one edge in which the flexible bar 81 resides, a lengthwise shoulder 88 adjacent to such channel-bar, and a V-shaped groove 89 in its opposite edge. Each clamp comprises a block 90 resting on the top of the bar and having a marginal flange 91 bearing on the shoulder 88, the other end or side of the block having a screw-actuated clamp-plate 92 engaging the V-shaped groove. By these means, the block is rendered adjustable lengthwise the bar and may be fixedly held in any adjusted position. The block affords a support for a screw 93 having a castellated end 94 in one cross-slot of which a pin 95 fits, thus preventing turning of the screw in its bearing or socket. Mounted to oscillate on this screw is a gear 96 having an operating handle 97, the gear being in mesh with a suitably-guided sliding-rack 98 having a downturned end fitting in the groove of the flexible channel-bar (Figure 13). At one side of the gear, the screw is fitted with a loose block 99 and beyond this with a nut-handle 100, the turning of which tightens the block against the gear, preventing its movement as well as that of the rack and hence the flexible bar.

In order to adequately support the bar 75 and its associated elements a supporting track 101 (Figure 1) is provided, being held in position or supported by a pair of brackets 102, 102 mounted on the base of the guide member so as to be angularly adjusted therewith.

To pull the combination slide 33—50 to the left and hold its roller 52 in engagement with the side-face of the flexible channel-bar 81, a cord or cable 103 (Figure 1) is fastened to the slide 50 and passes over a suitable supporting sheave 104, a suitable weight 105 being secured to its depending end.

Screw mechanism is employed to feed the wedge 74—75 rearwardly step by step, thus intermittently shifting the combined slide and glass-tube to the right and this includes a long screw-threaded shaft 110 rotatably mounted in bearings 111 and 112 at the front and rear ends respectively of the guide-member 70, one end of such shaft engaging a thrust-bearing 112$^a$ (Figures 1, 3, 4, 7, and 8). As is clearly shown in Figure 4, the thread of this screw-shaft has a rear straight face or edge and a front sloping or beveled face to permit the nut element 121, referred to later, to engage the screw shaft and take up the slack in the mechanism, as described hereinafter.

The carriage 74 has opposed guideways 113, 113 (Figure 5) in which is slidingly fitted a plate or supplemental carriage 114 which has a bar 115 (Figures 3 and 4) pivoted or hinged thereon at its rear end at 116, such element 115 at its front end carrying a mutilated or apertured sleeve 117 (Figures 3, 4, and 5) surrounding the screw-shaft. A yoke 118 hinged to the underside of the bar at 119 supports a forwardly-projecting bar 120 on which a substantially-semicircular nut 121 is mounted by means of screws 122, 122. Such half-nut is adapted to engage and co-act with the upper half of the thread of the screw-shaft by projecting downwardly through the aperture of the sleeve. To hold such half-nut in engagement with the thread of the shaft two links 123, 123 are hinged at 124 to the lower portion of the sleeve and at their apertured upper ends they are connected together by a shaft or rod 125. A catch or lock 126 provided with an operating handle 127 is pivoted on a pin 128 mounted in ears 129, 129 upstanding from and integral with the half-nut 121, such element 126 also having a pivotal connection with the rod or shaft 125 and equipped with a footpiece or stop 130 adapted to engage the top face of bar 120. When handle 127 is in the position indicated in Figure 4 the mutilated nut is in engagement with the thread of the screw, but if the handle is swung to the left the toggle connection is bent and the nut is raised to an inoperative position.

In order to restrict the turning tendency of the nut and to prevent it from springing or depressing the screw-shaft downwardly somewhat, the sleeve 117 has ribs 131, 132 (Figure 5) outstanding from its opposite sides and adapted to fit in oppositely-facing grooves in standards 133 and 134 having a base mounted on the plate 114. (See also Figure 3.)

As is shown in Figure 3, the plate 114 and the carriage 74 may be secured together by one or more pins 135 to cause them to travel together as a unitary structure when the machine is employed to graduate untapered tubes.

To pull the carriage forwardly it is fitted with a cord or cable 136 secured thereto and passing over a pulley 137, the hanging end of the cable being equipped with a suitable weight 138 (Figure 1).

To interruptedly or intermittently rotate the long screw shaft 110 to feed the wedge 74—75 step by step and hence cause a similar movement of the glass-tube, it will be necessary to start with the main drive-shaft and trace the operative connections to the screw-shaft.

Such main drive-shaft 140 (Figure 1) located at the right-hand portion of the machine and disposed at an acute angle to the axis of the glass-tube is revoluble in bearings 141 and 142 being driven by a belt-operated pulley 143. At its right-hand and, (Figures 1, 9, and 10) such shaft is provided with an eccentric or cam 144 encircling which is a sleeve 145 pivotally connected at its top and bottom to a yoke 146 having an extension arm pivoted at 147 to an upper short arm 148 fixed to a vertical shaft 149 carrying a longer arm 150 at its lower end connected by a long link 151 to an arm 152 (Figures 1 and 7) on the lower end of an upright shaft 153 having a bearing in a bracket 154, an arm 155 on the upper end of the shaft being connected by a link 156 to a bifurcated rock-arm 157 (Figures 7 and 8) oscillatory on a short shaft or bolt 158, the upper end of the rock-arm by means of a link 159 being operatively connected to a bifurcated member 160, the hub of which is free to rock on the cylindrical protruding portion of the bearing 112. The element 160 carries a spring-pulled pawl 161 co-acting with a ratchet 162 fixed to the screw-shaft. The arm 157 and the link 159 form a toggle which passes slightly beyond the dead center as shown in Figure 7 at each actuation, whereby there is complete assurance that the pawl will travel the same amount each time it is operated.

From an understanding of this construction and its mode of operation, no difficulty will be experienced in fully comprehending how the main drive-shaft through this rather long connection actuates the screw-shaft step by step.

To intermittently interrupt the action of the screw-shaft at times during the graduation operation, as when it is required to mark each tenth graduation entirely around the tube, and to stop the rotation of the screw-shaft when the graduating of the glass-tube has been completed, the following co-operating elements are provided.

Pawl 161 on one side has a projecting roller 163 (Figure 7) adapted to co-act with a bent pawl-controlling arm 164 free to oscillate on the end portion of a longitudinal shaft 165 rockingly and slidingly mounted in suitable bearings 166 and 167, (Figure 1) such element 164 being connected by a link 168 (Figure 7) to an arm 169 clamped on a shaft 170 oscillatory and slidable in bearings 171 (Figure 8) and 172 (Figure 6) and supplied with a torsion-spring connection 173 tending to rock the shaft in a direction to hold the arm 164 down out of co-operative relation with pawl 161. Shaft 170 has a curved arm 174 (Figure 6) fixed thereto with its end above a spring-pressed vertically-slidable rod 175 (Figures 2 and 5) accommodated in the aperture of bolt 72 and adapted to be lifted by one arm of a bell-crank 176 fulcrumed beneath the table at 177, the other end of the arm being connected by a long link 178 (Figures 1, 2, and 6) to one arm of a bell-crank 179 (Figure 1) fulcrumed at 180 and having its other arm provided with a roller 181 co-acting with a cam 182 on the side of the gear 183 in mesh with and having eleven times as many teeth as a pinion 184 on the main shaft 140 by which it is driven. Gear 183 is mounted on and drives or rotates a jackshaft 185 revoluble in bearings 186 and 187.

Thus it will be seen that once during each revolution of shaft 185, gear 183, and cam 182, by means of the connecting mechanism described, the pawl 161 will be rendered inactive for a period, hence interrupting the intermittent rotation of the screw-shaft to enable the scriber or marker described below to cut each tenth graduation line in the wax entirely around the tube. The pinion 184 makes one complete revolution for the marking of each short line and two complete revolutions for each long tenth line all the way around the tube. The large gear 183 makes one complete revolution during the marking of each ten lines.

To automatically stop the operation of the machine after the final graduation line has been drawn on the tube, the following specified co-acting parts are used.

As is shown in Figures 1, 3, and 5 the longitudinal shaft 165 is provided with a plurality of spaced, spirally-arranged outstanding pins or rollers 188 (eight in the present instance) and a collar 189 spaced apart distances corresponding to fifty graduation lines on the glass-tube and has also a notched disc 190 (Figure 7) fixed to the shaft and with which co-acts a stationary spring-catch 191, whereby the shaft may be turned by hand to bring and hold or lock the shaft with any one of the pins or rollers 188 or the end-collar 189 in alignment or register with a lug 192 (Figure 3) carried by and extended laterally from a spring-pressed encased plunger 193 mounted on the standard 133, the stationary shell or housing 194 having a lengthwise slot to permit the projection of the lug therethrough.

When, therefore, during the travel of the carriage as occasioned by the feed screw-shaft the exposed lug 192 strikes the particular aligned pin 188 it will cause the pin-shaft 165 to be shifted lengthwise slightly in its bearings, which movement is transmitted to a lever 195 (Figures 7 and 8), fulcrumed at 196 and overlying the ends of both shafts 165 and 170, and to the latter shaft moving it to the left as the parts are viewed in Figure 6 and 8. In a slot at its forward end shaft 170 has pivoted thereto an arm 197 (see Figures 5 and 6) one end of which is received in a recess 198 in a stationary block 199. When, therefore, shaft 170 is slid to the left, the free end of arm 197 will be moved to a position over the end of arm 174 and directly above the vertically-slidable rod or pin 175 and also beneath an upper arm 200 on a suitably-journaled rock-shaft 201 having a downwardly-extended arm 202 connected to a long rod 203. Such rod 203 extends through a hole in the lower extension of a lever 204 (Figures 2, 9, and 10) fulcrumed slightly loosely on the frame at 205 (Figure 10) and having an upstanding arm 206 on which an anti-friction grooved roller 207 is rotatably mounted. On its right-hand threaded end rod 203 has a nut 208 adapted to engage the side of the lever and rock it slightly laterally to the left as the parts are viewed in Figure 9. Rod 203 is encircled by a coil-spring 209 bearing at one end against the lever and at its other end against a cotter-pin 210 extended through the rod and to which another inclined coil-spring 211 is fastened, the opposite end of the spring being connected to a slotted guide-plate 212 bolted to the frame, whereby the spring tends to lift lever 204, the latter extending through the slot of such guide-plate and having a reduced end 213 projecting forwardly therefrom. When rod 203 is shifted to the left (Figure 9), it rocks the lever 204 sidewise on its fulcrum to move the roller 207 to the right into the path of travel of a circular rib 214 (Figure 9) on the eccentric sleeve 145, whereby the rib engages the roller and forces the lever down against the lifting action of spring 211.

A friction-clutch 215 (Figures 1 and 9) operative when slid to the right, is adapted to couple the belt-driven pulley 143 to the main-drive-shaft 140, being actuated by a suitable yoke 216 on a rock-shaft 217 (Figures 1, 2, 9, and 10) provided with a depending operating handle 218 and a downwardly-extended arm 219 fastened to the shaft, such arm having a pin and slot connection 220 with an inclined slide-bar 221 extended through and supported by a slotted guide-member 222 fastened to the frame, a coil-spring 223 secured to the bar and to member 212 tending to slide the bar to the right. This is normally prevented, however, by the part 213 of the lever 204 which extends across the end of the bar as shown in Figures 9 and 10, hence maintaining the friction-clutch in operative condition. When rod 203 is pulled to the left roller 207 is shifted into the field of travel of rib 214 which engages the roller and depresses lever 204 moving its end away from the bar 221, whereupon the latter, under the action of its spring 223 moves to the right, forcing the yoke 216 to the left and rendering the clutch inoperative, in other words, disengaging the constantly-driven pulley 143 from the drive-shaft 140.

In addition to the pin-shaft 165, member 70 also has a suitably-journaled, shorter, parallel pin-shaft 224 (Figures 1 and 5) provided with a series of four, radially-projecting pins 225, 226, 227, and 228, corresponding to the 100th, 200th, 300th, and 400th graduations on the tube, no pin for the 500th graduation being employed because the machine automatically stops upon making the 500th or final line. At its front end such shaft has a depending arm 229 (Figures 2 and 5) secured thereto which is pivoted to a long, horizontal, handle-rod 230 supported at its other end by a link 231 (Figure 2) pivoted to the machine-frame. Carriage 74 has a lateral lug or projection 232 (Figures 1, 3, and 5) adapted to engage any one of the pins on shaft 224 brought into alignment therewith by reason of turning the shaft through manipulation of the handle rod 230. The purpose of this construction is to be able to quickly preliminarily shift the position of the carriage 74 and the flexible channel-bar 81 which it carries to definite positions corresponding to the various 100th lines indicated. The purpose of this preliminary setting of the machine will be described hereinafter.

Figure 11:
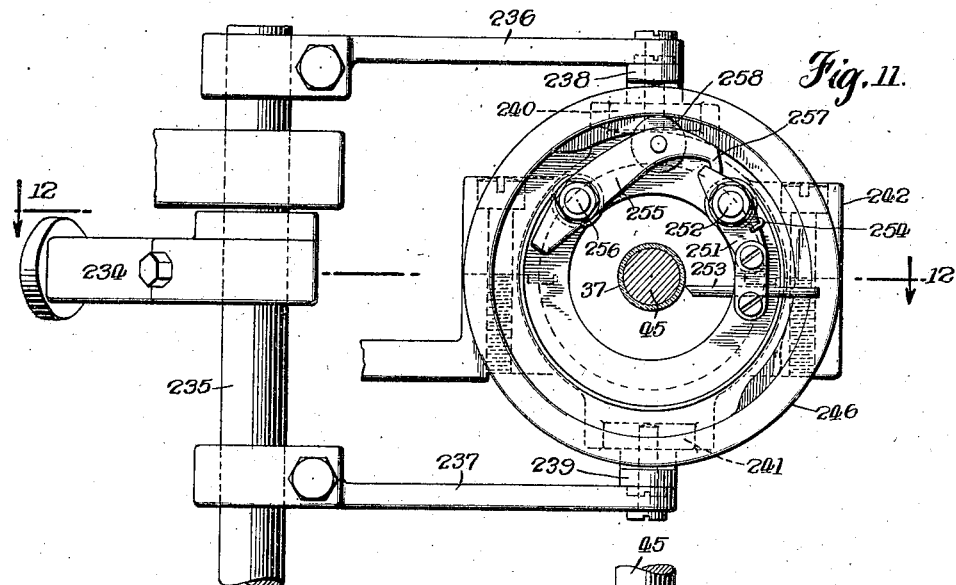
Figure 11 is an elevation of the marking or scribing portion of the device, the glass-tube operated upon and its internal rod being shown in section.
Figure 12:
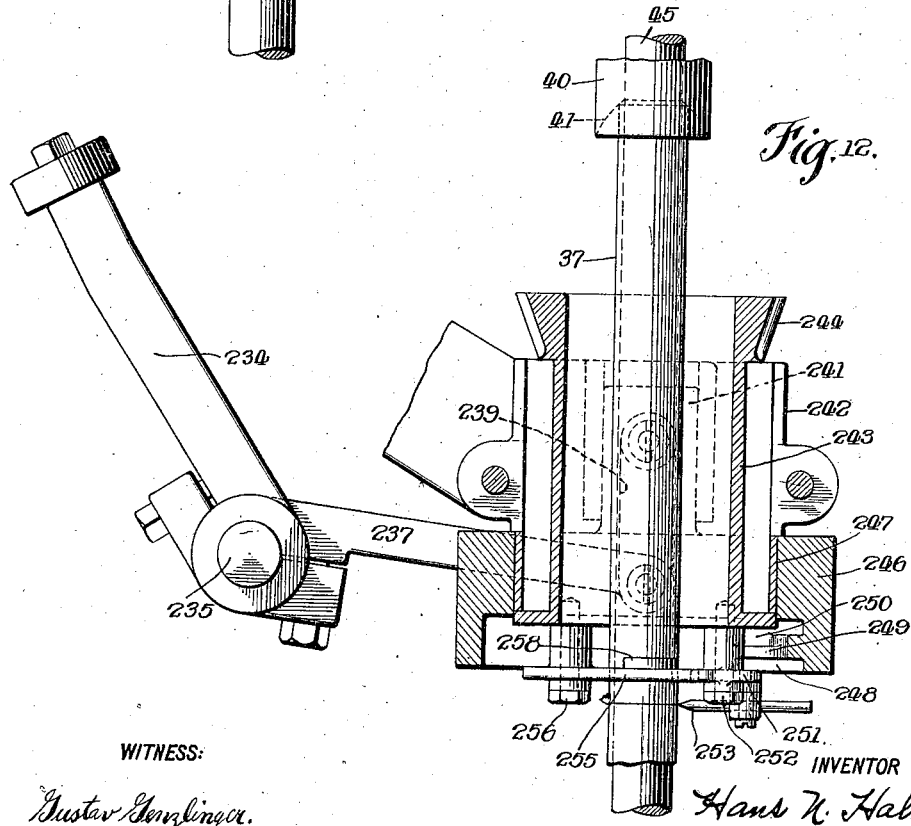
Figure 12 is a horizontal section on line 12—12 of Figure 11.

Turning now to the means for marking the scale or graduation lines on the tubes, jack-shaft 185 has a cam 233 (Figure 1) co-acting with a roller on an arm 234 (Figures 1, 11, and 12) fixed to a vertical rock-shaft 235 having upper and lower arms 236, 237 rigid therewith connected by links 238, 239 to two slides 240, 241 reciprocatory in longitudinal grooves in the top and bottom surfaces of a stationary bearing 242 which internally accommodates a rotary sleeve 243 through which the glass-tube 37 to be graduated extends. Such sleeve is revolved by a bevel-gear 244 cut thereon and an intermeshing bevel-gear 245 on the drive or clutch shaft 140 (Figure 1). The two slide-blocks 240 and 241 carry a sleeve 246 fitted over and slidable lengthwise on a finished portion of the bearing 242.

Internally near one end the sleeve 246 has a cylindrical surface 248 and two adjacent cam-surfaces 249 and 250 adapted to control the length of contact of the scriber or marker with the glass-tube.

On the adjacent end of sleeve or hollow-shaft 243 a lever 251 (Figures 11 and 12) is fulcrumed at 252 and carries a sharp-pointed needle or scriber 253 which is normally held in toward the glass-tube 37 on which it operates by means of a torsion or coil-spring 254 acting on the lever. In addition, another lever 255 is pivoted on the end of sleeve 243 at 256 the lever having a toe 257 overlying the tail-end of lever 251, and, additionally, lever 255 is supplied with an anti-friction roller 258 adapted to co-operate with the various cylindrical and cam surfaces of the cam-sleeve 246 depending upon the position of the latter as to which surface it co-acts with.

When cam-sleeve 246 is in such position that the cam-portion 249 is in register with the roller 258, the marker 253 will draw a unit line around about one-third of the circumference of the tube; and when the cam-surface 250 co-acts with such roller, a fifth line will be made which extends around about three-fifths of the circumference of the tube. When, however, the cam-sleeve 246 is in such position that the cylindrical surface 248 is in register with the roller 258, the position of lever 255 will be such, during the entire rotation of the scriber or marker 253, that the latter will engage the tube all the time and will make a tenth graduation line extending entirely around the tube.

To assist in preliminarily positioning the glass-tube to be graduated in the machine correctly, rack rod 54 is equipped with a rockable, spring-pressed needle or pointer 400 (Figures 1, 2, 22, 23 and 24) which may be swung up into operative position adjacent to the glass-tube or may be turned down into inoperative position out of the way during the actual graduating operation.

It will be observed that such pointer 400 is adjustably clamped in a collar 401 rockable on the rod or shaft 54 being held frictionally in any desired position by reason of the manner in which it is held pressed against the face of a clamp 402 secured to the rod.

The collar is positioned between this clamp and another similar one 403, a coiled spring 404 encircling the hub of the collar and bearing at one end against the element 403 and at its other end against an enlarged part of the collar, such spring, therefore, maintaining the collar pressed against the clamp 402 with sufficient pressure to maintain the pointer in any desired position but permitting its rocking on the rod to any other desired position.

By reference to Figure 1 of the drawing, it will be noted that the roller 51 is directly under and concentric with the pivot 73 (Figure 2) of the slide and the bar 75.

This is the neutral or first line position of the part and while slide 74 is in this position the bar 75 may be swung to the right or to the left on its pivot 73 without imparting any movement to the pointer or needle 400 which is connected to the roller 51 through the bar 54, the connecting block 155 and the slide plate 50.

With the slide 74 in this first line position, the pointer by adjusting the clamps 402 and 403 is set to register with the rotatable marker or scriber 253.

Assuming that a straight, untapered glass-tube, such as is used for a burette is to be provided with five hundred graduation lines corresponding to five hundred cubic centimeters, the operation of the machine is effected as follows:

First. The tube is graduated by hand by voluminal measurement and short temporary lines marked thereon at the points corresponding to 0, 100, 200, 300, 400, and 500 cubic centimeters, the position of which marks have been indicated in Figures 1 and 2 by the reference characters 300, 301, 302, 303, 304, and 305. This is conveniently done by introducing into the tube known volumes of liquid such as water, and marking the heights thereof on the outside of the tube. We are now sure that these several 100th marks are exactly correct, but the distances between them are not necessarily precisely alike because of unavoidable variations in the bore or internal caliber of the tube.

Second. The combined carriage 74—114 with its two elements locked together by the pin 135 is shifted to the position for making the final graduation line on the glass-tube.

Third. By turning the hand-wheel 305ª fixed on shaft 140 the latter is backed up one complete turn so as to bring the needle or marker 253 to final line marking position, otherwise it would be in a position to draw a short length unit line, because the last mark which it made on the preceding tube was a 500th line extending all the way around the tube, and, in order to make a zero line entirely around the new or present tube, this slight backing up or reversing action is required.

Fourth. The metal rod 45 having been clamped permanently in standard 35 in any suitable manner as by a set screw or clamp, and the parts shown in section in Figure 17 having been removed from their standard and the rod 45, the glass-tube to be graduated is applied to the rod, the latter acting as a guide to facilitate the insertion of the tube through the rotary sleeve 243 and the adjacent marker which is temporarily held slightly away from the tube by any approved means, as, for example, a small block (not shown) interposed between its tail and the part 257. Then the sectioned parts shown in Figure 17 are placed on the rod and locked in the standard 36.

Fifth. The zero mark on the tube and the hinged zero pointer 400 (temporarily swung up into position) on the rack-bar 56 are brought into register while the carriage 74—114 is still in final line position, by loosening the clamp 62, turning handle 64, manipulating the knurled-wheel 61 which changes the distance between the two slides 33 and 50, and then tightening the clamp 62 again. During this registration the position of the rack pointer 400 does not change, but the slide carrying the glass-tube only moves. Thus the previously-set pointer 400 is used to adjust the glass-tube by while the carriage is in final line marking position, the scriber or marker at this time being at about but perhaps not exactly at the final line position on the tube.

Sixth. Now the clamp 80 is loosened and the length of the telescopic link adjusted to make the angular position of the flexible channel-bar 81 such that the final or 500th line on the glass-tube is nearly opposite the needle or marker 253. The clamp is then locked and the final adjustment is made by turning the knurled nut 79 to the right or left as the case may be to bring such final line to correspond to the position of the marking needle 253.

Seventh. By swinging handle 127 to the left as the parts are viewed in Figure 4, the half-nut 121 is raised out of co-operative relation with the screw-shaft 110.

Eighth. Handle 230 is shifted to the left to bring the 400th position pin 228 into register with the lug 232 of the sliding carriage, the latter being moved to bring the lug into contact with the pin.

Ninth. Handle 127 is swung to the right as viewed in Figures 3 and 4 to bring the nut 121 into co-operative relation with the screw-shaft 110. By reason of the hinging or pivoting of the half-nut at the point 119 a substantial distance below the axis of the screw-shaft, the shifting of the half-nut into mesh with the screw thread of the shaft, moves the nut and associated parts slightly to the right as the elements are viewed in Figure 4, thus eliminating the slack in the mechanism and shifting the carriage 74—114 back slightly from such 400th positioning pin 228.

Tenth. The clamping member 86 corresponding to the 400th position is adjusted to cause the flexible bar 81 to bring the 400th temporary line 304 on the glass-tube into register with the marking needle or scriber 253.

Eleventh. By the use of the shaft 224, which is actuated by the handle 230, the carriage is adjusted successively to the different hundredth positions and the corresponding flexible-bar clamps 85, 84, and 83, are manipulated to adjust the flexible-bar to cause the remaining temporary hundredth lines on the glass-tube to register in sequence with the scriber or marker 253, which, during such preliminary adjustment, may be caused to occupy a position slightly away from the tube so as not to touch it.

Twelfth. The screw-actuated slide or carriage 74—114 is brought to zero position as illustrated in Figure 1 at which time the temporary zero marking on the glass-tube, the scriber 253, and the rack-pointer 400 will all be in register.

Thirteenth. Clutch 215 is now rendered operative by handle 218 and the machine continues in action until the final line is drawn in the wax on the tube, the clutch being maintained active by reason of lever 204 overlying the end of bar 221, but the clutch may be thrown out by hand at any time by reason of the presence of the pin and slot connection 220.

Fourteenth. At zero position, and while the screw-feed of the carriage is inactive, the scriber marks the 0 line around the entire circumference of the tube, the surface 248 being in register with the roller 258, and, in addition, the scriber continues marking around or over the same 0 circle line already made a distance equal to the length of a unit line (in the present instance about one-third of the way around the tube). During this extra marking, sleeve 246 is shifted to bring cam surface 249 into register with roller 258, whereby when such 0 unit excess marking is completed, the scriber is automatically lifted just as though it had been making a unit line only. During the remaining two-thirds of such second revolution of the scriber at the 0 position, the tube is automatically moved longitudinally to bring the first unit position into register with the scriber by means of the following co-operating elements; cam 144, cam-sleeve 145, yoke 146, arms 147 and 148, shaft 149, arm 150, link 151, arm 152, shaft 153, arm 155, link 156, rock-arms 157, link 159, pawl 161, ratchet 162, screw-shaft 110, nut 121, bar 120, yoke 118, pin 119, bar 115, screw 116, slide 114, pin 135, carriage 74, bar 75, flexible channel-bar 81, roller 52, slide 50, rod 54, rack 56, clamp 62, slide 33, and head and tail stocks 35 and 36. Stated somewhat differently, the screw-shaft is given a partial rotation by the pawl and ratchet mechanism such turning of the screw-shaft feeding the wedge 74, 75 rearwardly a small amount, thereby sliding the members carrying the glass-tube.

After the glass-tube has reached this unit position and during the next stationary period of the screw-shaft and carriage, the scriber drops on to the tube, marks a unit line one-third of the way around the tube, and then, during the succeeding two-thirds rotation of the scriber, is lifted off of the tube, and by the means described, the tube is advanced a second unit distance. Thus, four parallel unit marks are made, but when the fifth unit line is marked on the tube, cam-surface 250 will have been moved into co-operative relation with the scriber and everything occurs as for the other unit lines except that such fifth line is longer, being desirably about three-fifths of the circumference of the tube, then cam 249 is again brought into action on the scriber during the marking of the sixth, seventh, eighth, and ninth unit lines.

During the first rotation of the scriber around the tube, during the marking of the first 360 degrees of the tenth graduation line, the pawl 161 is rendered inactive on the ratchet and screw-shaft by reason of the action of the following parts:—cam 182, roller 181, bell-crank 179, link 178, bell-crank 176, pin or rod 175, arm 174, shaft 170, arm 169, link 168, and pawl-controlling arm 164. As a result, the succeeding or supplementary unit line is marked on the same circle, the tube being then stepped along to the next unit or eleventh line position, the part 164 in the meantime being rendered inactive. It is because of the marking of the tenth lines in the manner indicated that the gear 183 has eleven times as many teeth as its driving pinion 184, two revolutions of the scriber being consumed in the production of each tenth line, but only one being employed for each unit line.

Thus, the graduation marking continues automatically until the last hundredth line (500th in the present instance) is completed, and when this occurs, the projection 192 by engagement with the collar 189 on shaft 165 slides the latter rearwardly, rocks lever 195 on its fulcrum, causing a forward sliding of shaft 170, thus bringing the space-bar 197 between the ends of the two arms 174 and 200, whereby when the cam 182 by the connections described, slides the pin 175 vertically, the arm 200 will be rocked upwardly and through the connection 201, 202, 203, and 208, will move the lever 204 laterally, bringing its roller 207 into the path of action of rib 214, so that the latter depresses the lever, releasing the bar 221 which responds to the action of spring 223, rocking shaft 217 to render the clutch inactive through the movement of its yoke 216, thus stopping the rotation of the main shaft 140 and all the parts of the mechanism. The completely-graduated tube is now removed from the machine.

Tubes of the character described do not vary abruptly or suddenly in internal diameter, and, if it were attempted to graduate the distance between each two adjacent preliminary or initial marks 300–1–2–3–4–5 by equally-spaced lines, there would be somewhat sharp changes in the graduations at such hundredth lines which would not conform to the real conditions of the internal caliber of the tube. By flexing the wedge-channel-bar 81 around such hundredth line points abrupt graduation changes are avoided and made gradual to harmonize with the bore conditions of the tube.

In case it is desired to graduate a tube partly straight and partly tapered, such as a centrifuge tube, the following additional elements are employed.

Plate or slide 114 has a guide-plate 500 adjustably mounted thereon by means of screws 501 and 502, the former extending through a hole of the same size in plate 500 and threaded into a hole of the slide, the latter passing through a slot 503 in plate 500 and taking into a threaded hole in the slide. By these means this guide-plate, which in use is rigid with the slide, is nevertheless angularly adjustable thereon. Above and spaced away from such guide-plate is a retaining-element 504 and between the two I provide a bar 505 equipped at one end with a roller 506 adapted to travel on the edge of a guide-plate 500 and supplied with a hook-portion 507 at its other end designed at the proper moment during the sliding travel of the elements 114 and 74 to encounter a roller 508 on a stationary block 509 adjustable transversely of the slide on member 510 adjustably clamped to a rail portion 511 forming part of the member 70 and parallel to the axis of the screw-shaft 110.

Roller 506 also travels on the edge of a bar 512 fulcrumed on the carriage 74 at 513, the bar being bent or offset laterally an amount corresponding to the width of the bar plus the diameter of the roller 506, the opposite end of the bar being intended at the proper moment to engage a roller 514 on a block 515 adjustable laterally of the rail 511 on an element 516 mounted and adjustable on the rail lengthwise.

When this unequal graduation mechanism is employed for tapered bodies, the pin 135 which for straight-tube work locks the two elements 74 and 114 together, is removed and the travel of slide 114 brought about by the turning of the screw-shaft is transmitted to the guide-plate 500, roller 506, and bar 512 to the carriage 74, it being noted that when straight-tube work is being done, the axis of the roller 506 is directly above the axis of fulcrum 513 whereby there is no tendency for such transmission of power through the roller to change the position of the bent-bar 512. So long, therefore, as the hook 507 is not in contact with the roller 508 and the bar 512 is not in engagement with the roller 514, the machine will operate just as though the two parts 114 and 74 were locked together by the pin 135, and it will effect graduations for the straight portion of the tube in the manner described in detail above. When the tube operated upon has been shifted so that the beginning of its tapered portion is in register with the scriber or marker the hook 507 will come into contact with the roller 508 and the bar 512 will engage the periphery of roller 514. Further travel of the slide 114 causes the roller 506 to move along the edge of the guide-plate 500 as is indicated by a comparison of Figures 19 and 20, thus causing an accelerated movement of carriage 74 through bar 512 and, consequently, a similar accelerated movement of the flexed channel-bar 81, the travel of which causes a correspondingly uneven longitudinal movement of the glass-tube. During the rolling of roller 506 between the two elements 500 and 512, the travel of the carriage 74 becomes greater and greater for each uniform movement of the screw-shaft, and, accordingly, the spaces between the graduations on the tapered part of the tube increase, as they should, to correspond to the gradually decreasing volume capacity of such portion of the tube or other body.

I claim:

1. In a graduating-appliance of the character described, the combination of means to support the body to be graduated, scriber means for marking graduation lines on said body, means for moving said body and scriber relatively to one another to provide the spaces between the lines, and means to automatically control said scriber means to mark the lines on said body normally partway around the same but with certain of such lines extending entirely around the body, substantially as described.

2. In a graduating-appliance of the character described, the combination of means to support the body to be graduated, scriber means for marking graduation lines on said body, means for moving said body and scriber means relatively to one another to provide the spaces between the lines, and means to automatically control said scriber means to mark the graduation lines on said body with the unit lines of the same length, the fifth lines somewhat longer than the unit lines and the tenth lines extending entirely around the body, substantially as described.

3. In a graduating-appliance of the character described, the combination of means to support the body to be graduated, a scriber for marking the graduation lines circumferentially on said body, means to revolve said body and scriber relatively to one another, means to move said body and scriber relatively to one another along the axis of such revolution to provide the spaces between the graduation lines, and means controlling the periods of marking activities of the scriber during the relative rotation of the body and scriber, substantially as described.

4. In a graduating-appliance of the character described, the combination of means to support the body to be graduated, a scriber for marking the graduation lines on said body mounted to revolve around the body, means to effect such revolution, means to move said body and scriber relatively to one another to provide the spaces between the lines, and means controlling the periods of marking activities of the scriber during its revolutions around the body, substantially as described.

5. In a graduating-appliance of the character described, the combination of means to support the body to be graduated, a scriber for marking the graduation lines on said body, means to revolve said body and scriber relatively to one another, means to move said body and scriber relatively to one another to provide spaces between the graduation lines, and means controlling the periods of marking activities of the scriber during the relative revolutions of said scriber and body and causing the scriber at predetermined points to mark graduation lines entirely around the body, substantially as described.

6. In a graduating-appliance of the character described, the combination of means to support the body to be graduated, a scriber for marking the graduation lines on said body mounted to revolve around the body, means to revolve said scriber around such body, means to move said body and scriber relatively to one another to provide spaces between the lines, and cam means controlling the contact of the scriber with the body, substantially as described.

7. In a graduating appliance of the character described, the combination of means to support the body to be graduated, a scriber for marking the graduation lines on said body mounted to revolve around the body, means to revolve said scriber around said body, means to move said body and scriber relatively to one another to provide spaces between the graduation lines, cam means controlling the contact of the scriber with the body, and means to shift said cam means to render different surfaces thereof active on the scriber, substantially as described.

8. In a graduating appliance of the character described, the combination of means to support a hollow body to be graduated, a scriber to mark voluminal graduation lines on said body, means to move the body and scriber relatively to one another to effect the marking operation, manually operable means adjustable to conform substantially to the irregularities of the internal caliber of the body, and means under the control of said manually adjustable means to move said body and scriber relatively to one another automatically to provide spaces between the graduation lines in agreement with such caliber irregularities.

9. In a graduating-appliance of the character described, the combination of means to support the hollow body to be graduated, means to mark graduation lines on said body, and means to move said body and marker relatively to one another to produce the spaces between the lines including an element capable of adjustable flexing to produce variations in the spacings of the markings conforming to the irregularities of the internal caliber of the body, substantially as described.

10. In a graduating-appliance of the character described, the combination of means to support the hollow body to be graduated, means to mark graduation lines on said body, and means to move said body and marker relatively to one another to produce the spaces between the lines including a screw-actuated carriage, a flexible element mounted on said carriage, and means to adjustably flex said element, substantially as described.

11. In a graduating-appliance of the character described, the combination of a slidable support for the hollow body to be graduated, means to slide said support including a carriage slidable at an angle to the direction of travel of said support, a flexible bar on said carriage causing the sliding travel of said support, and means to adjustably flex said bar to modify the travel of said support, and scriber means to mark the spaced graduation lines on said body, substantially as described.

12. In a graduating-appliance of the character described, the combination of a support for the body to be graduated, a scriber to mark the graduation lines on said body, means to actuate said scriber, and means to move said body and scriber relatively to one another to create the spaces between said lines including a sliding carriage, an operating screw-shaft, a nut on said carriage coacting with said shaft, means to shift said nut into and out of engagement with the thread of said shaft, and means to take up the slack in the operating mechanism, substantially as described.

13. In a graduating-appliance of the character described, the combination of a support for the body to be graduated, a scriber to mark the graduation lines on said body, means to actuate said scriber, and means to move said body and scriber relatively to one another to create the spaces between said lines including a sliding carriage, an operating screw-shaft, a nut on said carriage coacting with said shaft, means to shift said nut into and out of engagement with the thread of said shaft, and means to take up the slack in the operating mechanism when the nut is thrown into engagement with the screw-shaft, substantially as described.

14. In a graduating-appliance of the character described, the combination of a support for the body to be graduated, a scriber to mark the graduation lines on said body, means to actuate said scriber, and means to move said body and scriber relatively to one another to create the spaces between said lines including a sliding carriage, an operating screw-shaft, a nut on said carriage coacting with said shaft, means to shift said nut into and out of engagement with the thread of said shaft, the threads of said shaft and nut having beveled co-acting surfaces, and means to take up the slack in the operating mechanism when the nut is thrown into co-operative relation with the shaft, substantially as described.

15. In a graduating-appliance of the character described, the combination of a support for the body to be graduated, a scriber to mark the graduation lines on said body, means to actuate said scriber, and means to move said body and scriber relatively to one another to create the spaces between said lines including a sliding carriage, an operating screw-shaft, and a nut adapted to co-act with said screw-shaft to feed the carriage along and having a remote pivotal connection with the carriage, whereby wabbling of the shaft will have substantially no detrimental effects on the travel of the carriage, substantially as described.

16. In a graduating-appliance of the character described, the combination of a support for the body to be graduated, a scriber to mark the graduation lines on said body, means to actuate said scriber, and means to move said body and scriber relatively to one another to create the spaces between said lines including a sliding carriage, an operating screw-shaft, a relatively-long bar pivotally connected to said carriage, and a nut on said bar remote from said pivotal connection adapted to co-act with said screw-shaft to feed the carriage along, substantially as described.

17. In a graduating-appliance of the character described, the combination of a support for the body to be graduated, a scriber to mark the graduation lines on said body, means to move said body and scriber relatively to one another to create the spaces between the graduation lines including a sliding carriage, a screw-shaft, a nut co-acting with the screw-shaft, and means pivotally connecting said nut and carriage at a point remote from the engagement of the nut with the screw-shaft to permit wabbling of the latter without having a substantial effect on the travel of the carriage, substantially as described.

18. In a machine of the character described, the combination of means to support the body to be graduated, a scriber to mark the graduation lines on said body, means to revolve the scriber around said body eleven times for marking each ten graduations, means to control the contact of the scriber with the body, and means to move said body and scriber relatively to one another to provide the spaces between the graduation lines, substantially as described.

19. In a machine of the character described, the combination of means to support the body to be graduated, a scriber to mark the graduation lines on said body, means to revolve the scriber around said body, means to move said body and scriber relatively to one another to provide the spaces between the graduation lines, and means to control said scriber whereby the unit lines are of less length than the tenth lines, each of the latter being formed during more than one revolution of the scriber, substantially as described.

20. In a machine of the character described, the combination of means to support the body to be graduated, a scriber, means to cause said scriber to mark spaced graduation lines on said body with the final line extending completely around the body, and means to automatically stop the operation of the machine upon completion of the marking of said final line, substantially as described.

21. In a machine of the character described, the combination of means to support a body having a hollow interior tapered at least in part, a scriber, means to cause said scriber to mark voluminal graduation lines on said body, and means to move said body and scriber automatically relatively to one another to space said graduation lines in conformity with the volume of the interior of the body at the points marked by such lines, substantially as described.

22. In a machine of the character described, the combination of means to support a body having a hollow interior in part substantially straight and in part tapered, a scriber, means to cause said scriber to mark voluminal graduation lines on said body, and means to move said body and scriber automatically relatively to one another to space said graduation lines in conformity with the volume of the interior of the body at the points marked by such graduation lines, substantially as described.

23. In a graduating appliance of the character described, the combination of means to support a body having a hollow interior tapered at least in part, a scriber, means to cause said scriber to mark voluminal graduation lines on said body, manually operable means adjustable to conform substantially to the irregularities of the internal caliber of the body, and means under the control of said manually adjustable means to move said body and scriber relatively to one another automatically to provide spaces between the graduation lines in agreement with the general shape of the interior caliber of the body and compensating for the irregularities in such caliber.

24. In a graduating machine of the character described, the combination of means to support the body to be graduated, a scriber, means to cause the scriber to mark voluminal graduation lines on said body, means to move said body and scriber automatically relatively to one another to produce the spaces between the lines, and means to permit preliminary manual adjustment of said moving means to register the scriber with spaced initial volume marks on the body, substantially as described.

HANS N. HALVERSEN.